United States Patent
Nakamura

[19]
[11] Patent Number: 5,917,578
[45] Date of Patent: Jun. 29, 1999

[54] APPARATUS AND METHOD FOR PHOTOGRAPHIC PROCESS

[75] Inventor: Hiroaki Nakamura, Kanagawa, Japan

[73] Assignee: Fuji Photo Film Co., Ltd., Kanagawa, Japan

[21] Appl. No.: 08/839,754

[22] Filed: Apr. 15, 1997

[30] Foreign Application Priority Data

Apr. 15, 1996 [JP] Japan .................................. 8-092804

[51] Int. Cl.$^6$ .................................................. G03B 27/52
[52] U.S. Cl. ............................ 355/40; 355/41; 396/311; 396/319; 358/487; 358/506
[58] Field of Search .................. 355/32, 40, 41, 355/42; 396/311, 319; 358/487, 506, 523, 527

[56] References Cited

U.S. PATENT DOCUMENTS

| | | | |
|---|---|---|---|
| 5,461,440 | 10/1995 | Toyoda et al. .......................... | 396/311 |
| 5,602,618 | 2/1997 | Tanibata .................................... | 355/40 |
| 5,739,924 | 4/1998 | Sano ......................................... | 358/487 |
| 5,748,287 | 5/1998 | Takahashi et al. ........................ | 355/40 |

FOREIGN PATENT DOCUMENTS 7-159904  6/1995  Japan ............................. G03B 27/32

*Primary Examiner*—Alan A. Mathews
*Attorney, Agent, or Firm*—Sughrue, Mion, Zinn, Macpeak & Seas, PLLC

[57] ABSTRACT

An apparatus for photographic process is disclosed. Information regarding camera, lens, and film used in photographing are recorded on the film. In the photographic process, the information is acquired to determine the state of deterioration of the quality of the image recorded on the film, and the quality of the image is corrected based on the state of deterioration. Accordingly, an image of high quality can be always obtained regardless of the type of the camera used for photographing, the type of the photographic lens, and the characteristics of the photographic film.

7 Claims, 5 Drawing Sheets

APPARATUS AND METHOD FOR PHOTOGRAPHIC PROCESS

BACKGROUND OF THE INVENTION

1. Field of the Invention

The present invention relates to an apparatus and a method for photographic process and, more particularly, to an apparatus and a method for photographic process wherein the quality of an image photographed and recorded on a photographic film with a camera is corrected during process on the image such as during printing and display.

2. Description of the Related Art

Apparatuses for photographic process such as a photographic printing apparatus for printing an image photographed and recorded on a photographic film (e.g., a negative film) with a camera, and an image display apparatus for displaying an image photographed and recorded on a photographic film on a monitor such as a CRT, must be capable of providing photographic prints, display and the like with high image quality. For this purpose, for example, in a photographic printing apparatus, a photometric process is performed on an image photographed and recorded on a photographic film, and exposure level is determined based on the resultant photometric data such that the image of an objective or the like photographed and recorded, is printed in a proper density.

The quality of an image photographed and recorded on a photographic film significantly varies depending on the type of the camera used for photographing, the type of the photographic lens, and the characteristics of the photographic film on which the image is recorded. For example, an image photographed and recorded with a camera at a relatively low cost such as a so-called lens-loaded film and compact camera, is generally more susceptible to: fuzziness on the image as a whole, reduction in exposure level at the periphery of the image, reduction in contrast, distortion of an image of an object or the like, and bleeding of color, than an image photographed and recorded with a high-grade camera such as a single lens reflex camera. One of the reasons for these quality deterioration is internal reflections in the body of a camera. Even for images photographed and recorded with the same camera, the degree of deterioration such as image distortion and bleeding of color, can vary if conditions under which they are photographed vary when the camera is the lens replaceable type and photographs are taken with replaced lens. Further, it is known that a print created from an image photographed and recorded on a highly sensitive photographic film generally has higher graininess compared to a print created from an image photographed and recorded on a photographic film of lower sensitivity.

Meanwhile, if there is deterioration of image quality such as fuzz and distortion of an image itself photographed and recorded on a photographic film as described above, this can not be corrected only by performing a correction of the exposure level and the like as described above, and this puts a limitation on the improvement of the quality of the print. Especially, a recent trend toward cameras at lower prices such as lens-loaded films and compact cameras, and toward photographic films with higher sensitivity has resulted in a situation that deterioration of quality of an image photographed and recorded on a photographic film attributable to the type of the camera, the type of the photographic lens, and the characteristics of the photographic film used for photographing, significantly reduces the quality of a print obtained using a photographic printing apparatus.

While Japanese Patent Application Laid-Open (JP-A) No. 7-159904 disclosed an apparatus for correcting deterioration in the quality of images photographed and recorded on photographic films when they are printed, the technique described in this publication performs correction of the image quality simply based on photographic information magnetically recorded on the photographic film (information regarding time, distance, and conditions such as the stop), and therefore, can not correct deterioration of the image quality attributable to differences in cameras, lenses, and photographic films used for photographing as described above.

The present invention has been conceived taking the above-described situation into consideration, and it is an object of the present invention to provide an apparatus and a method for a photographic process which can always provide images of high quality irrespective of the types of the cameras used for photographing, the types of the lenses, and the characteristics of the photographic films.

SUMMARY OF THE INVENTION

In order to achieve the above-described object, according to a first aspect of the present invention, there is provided an apparatus for photographic process comprising:

an acquisition means for acquiring at least any one of information on a camera used for photographing and recording an image on a photographic film, information on a photographic lens used for photographing and recording the image with the camera, and information on the photographic film on which the image is photographed and recorded;

a determination means for determining the state of deterioration of the quality of the image recorded on the photographic film based on the information acquired by the acquisition means; and a correction means for correcting the deterioration of the quality of the image based on the state of deterioration of quality determined by the determination means.

According to the first aspect of the invention, the acquisition means acquires at least any one of information on the camera used for photographing and recording an image on a photographic film, information on the photographic lens used for photographing and recording the image with the camera, and information on the photographic film on which the image is photographed and recorded. For example, the information on the camera includes information showing the type of the camera, information showing the functions, specifications, and performance of the camera, and the like. As a specific example of the information showing the type of the camera, the model number and trade names in an encoded form and the like may be used. The information on the photographic lens includes, for example, information showing the type of the photographic lens (the model number, trade name, types such as a wide range telephotographic type, etc.). The information on the photographic lens may further include information showing the magnification and stop used at photographing. Further, the information on the photographic film includes, for example, the model number, trade name, sensitivity, manufacturer, production lot number, etc., of the photographic film.

The determination means determines the state of deterioration of the quality of an image recorded on the photographic film based on the information acquired by the acquisition means. The state of deterioration of the quality of an image recorded on a photographic film depends on the type of the camera used for photographing, the type of the photographic lens, the characteristics of the photographic film, and the like. Therefore, for example, the state of deterioration of the image quality is identified in advance through experiments on images photographed and recorded using various cameras, various types of photographic lenses (only for cameras adapted for replacement of photographic lenses), and various photographic films, and the resultant information showing the state of deterioration of image quality is stored in a memory or the like. Then, a determination may be made on the state of deterioration of the quality of an image that depends on the type of the camera used for photographing, the type of the photographic lens, and the characteristics of the photographic film, by searching information showing the state of deterioration of the image quality based on the information obtained as described above. The correction means corrects the deterioration of the image quality based on the state of deterioration of the image quality determined by the determination means.

As described above, since the state of deterioration of the image quality is determined and corrected based on information obtained on the camera, photographic lens, and photographic film used for photographing, it is possible to always provide an image of high quality regardless of the type of the camera used for photographing, the type of the photographic lens, the characteristics of the photographic film, and the like.

While the acquisition of information with the acquisition means maybe implemented, for example, by acquiring information input by an operator through a keyboard or the like, according to a second aspect of the invention, such information is preferably acquired by reading information optically or magnetically recorded on a photographic film. This eliminates the need for manually inputting such information by an operator and the like, thereby allowing operator load to be reduced.

According to a third aspect of the invention, in the first aspect of the invention, the apparatus further comprises an image reading means for reading an image recorded on the photographic film to acquire image data representing the image wherein the correction means performs the correction of the deterioration of the image quality on the image data acquired by the image reading means.

If an apparatus for photographic process according to the invention is a so-called digital type photographic processing apparatus which reads an image photographed and recorded on a photographic film, converts it into image data, and performs printing and the like using the converted image data, according to a fourth aspect of the invention, by correcting the image data acquired by the image reading means according to the third aspect of the invention, various correction processes can be carried out including correction of an MTF (modulation transfer function), the ratio of amounts of light between central and peripheral regions of an image, contrast, distortional aberration, chromatic aberration, and graininess. According to a fifth aspect of the invention, the degree of deterioration of an MTF, the ratio of amount of light between central and peripheral regions, contrast, distortional aberration, and chromatic aberration can be each determined based on the information on the camera and photographic lens, and the degree of deterioration of graininess can be determined based on the information on the photographic film.

According to a sixth aspect of the invention, there is provided a method for photographic process comprising the steps of:

acquiring at least any one of information on a camera used for photographing and recording an image on a photographic film, information on a photographic lens used for photographing and recording the image with the camera, and information on the photographic film on which the image is photographed and recorded;

determining the state of deterioration of the quality of the image recorded on the photographic film based on the acquired information; and correcting the deterioration of the quality of the image based on the determined state of deterioration of the quality.

Like the first aspect of the invention, the sixth aspect of the invention makes it possible to obtain an image of high quality regardless of the type of the camera used for photographing, the type of photographic lens, and the characteristics of the photographic film.

DETAILED DESCRIPTION OF THE PREFERRED EMBODIMENTS

An embodiment of the present invention will now be described with reference to the drawings.

Figure 1:
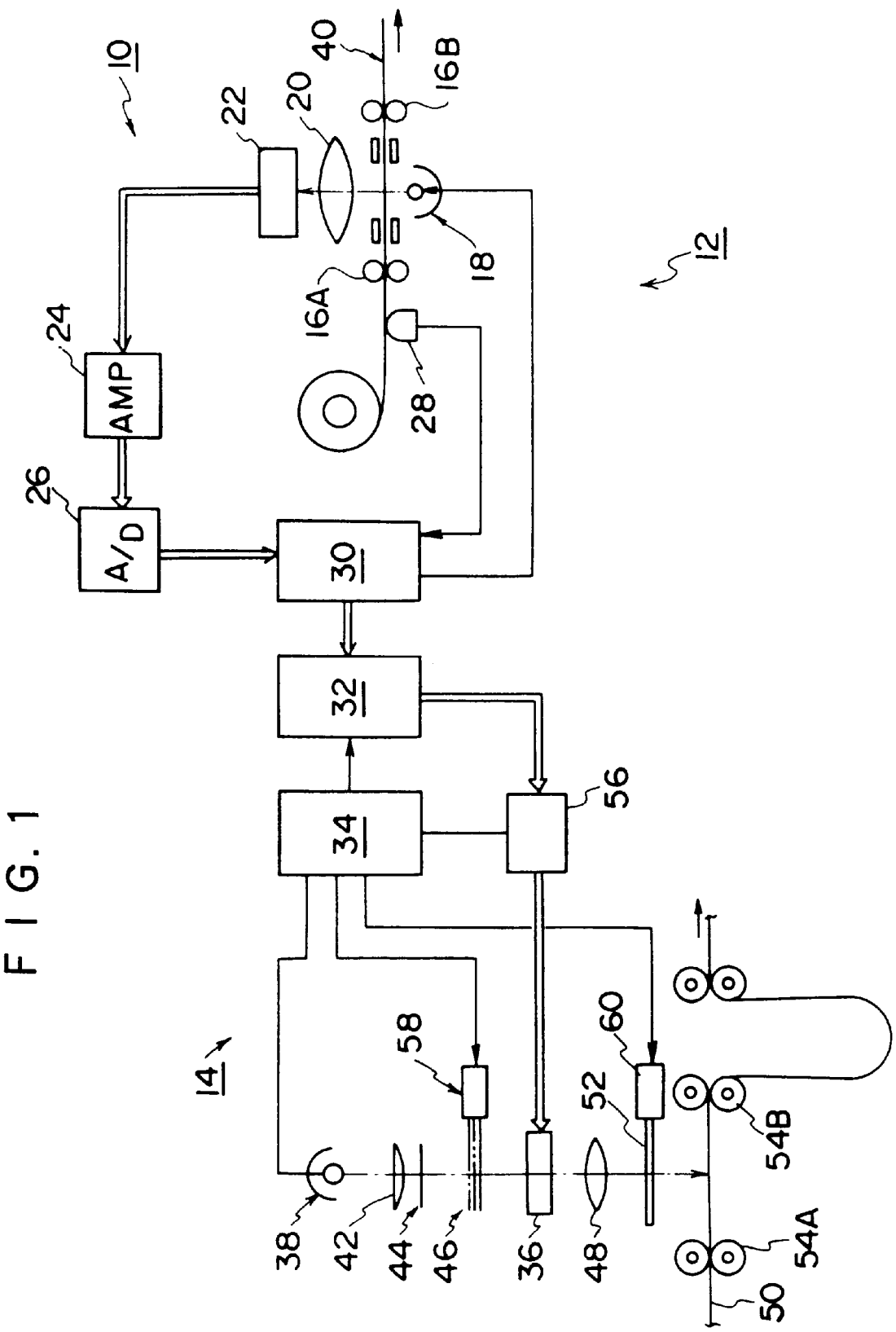
FIG. 1 illustrates a schematic configuration of a photographic printing apparatus to which the present invention is applied.

FIG. 1 shows a photographic printing apparatus 10 according to an embodiment of the present invention. The photographic printing apparatus 10 comprises an image reading portion 12 for reading images photographed and recorded on a negative film (photographic film) and converting them into digital image data and a printing portion 14 for printing the images read by the image reading portion 12 onto photographic paper. The image reading portion 12 includes a pair of transport rollers 16A and 16B for sequentially transporting a plurality of images photographed and recorded on a negative film 40 with a camera to a reading position. A light source 18 such as a halogen lamp is provided under the film transport path defined by the pair of transport rollers 16A and 16B. Over the film transport path defined by the pair of transport rollers 16A and 16B, there is provided a lens 20 and a CCD image sensor 22 thereover. Light which has been emitted from the light source 18 and transmitted by the negative film 40 forms an image on the CCD image sensor 22. The CCD image sensor 22 reads an image positioned on the reading position by dividing it into a multiplicity of regions (e.g., 256×256 pixels) and separating it into three colors, i.e., R (red), G (green), and B (blue) and outputs image data representing the density of the colors R, G, and B in each of the divided regions.

A reading head 28 is provided, in association with magnetic tracks S1 and S2 described later, upstream of the positions where the pair of transport rollers 16A and 16B are disposed as viewed in the transport direction of the negative film 40. The reading head 28 reads information magnetically recorded on the magnetic tracks S1 and S2 (to be detailed later) and outputs the information thus read to a first control portion 30. The first control portion 30 comprises a microcomputer and peripheral devices thereof. A sensor (not shown) for detecting perforations P (FIG. 2) on the negative film 40 is provided upstream of the position where the reading head 28 is disposed.

An amplifier 24 and an A/D converter 26 are sequentially series-connected to a signal output end of the CCD image sensor 22. The A/D converter 26 is connected to a first control portion 30, and the image data read by the CCD image sensor 22 is converted into digital data to be fetched into the first control portion 30. The first control portion 30 corrects the image data fetched from the CCD image sensor 22 based on the information input from the reading head 28 and stores the corrected image data in a memory 32.

Motors (not shown) for driving the pair of transport rollers 16A and 16B and the light source 18 are also connected to the first control portion 30 through drivers which are not shown. The first control portion 30 controls the pair of transport rollers 16A and 16B to position each of the image frames of the negative film 40 on the reading position and turns the light source 18 on to read the positioned image frames.

The print portion 14 includes a liquid crystal display panel (hereinafter referred to as "LCD panel") 36 as a display for displaying images to be printed. A light source 38 such as a halogen lamp is disposed over the LCD panel 36 and is followed by a collimator lens 42, an infrared filter 44, and a color filter 46 which are in the order listed. Under the LCD panel 36, a lens 48 is disposed and followed by a black shutter 52 and then photographic paper 50. Light which has been emitted by the light source 38 and transmitted sequentially by the lens 48, filters 44 and 46, and LCD panel 36 is formed into an image on the photographic paper 50 by the lens 48. The photographic paper 50 is wound into a roll and contained in a magazine (not shown) and is pulled out from the magazine and transported by a pair of transport rollers 54A and 54B to be positioned at a predetermined printing position. The color filter 46 is configured to include three filters of R, G, and B which are sequentially switched to position any one of the filters on a printing light path.

The memory 32 is connected to the LCD panel 36 through an LCD driver 56. The memory 32 is connected to a second control portion 34 comprising a microcomputer or the like to output image data to the LCD driver 56 in accordance with an instruction from the second control portion 34. The LCD driver 56 changes the transmittance of each of the pixels that form the LCD panel 36 in accordance with the input image data, to display an image on the LCD panel 36.

The color filter 46 and black shutter 52 are connected through a filter driving portion 58 and a shutter driving portion 60, respectively, to the second control portion 34 to which motors (not shown) for driving the pair of transport rollers 54A and 54B and the light source 38 are also connected through drivers (not shown).

Figure 2:
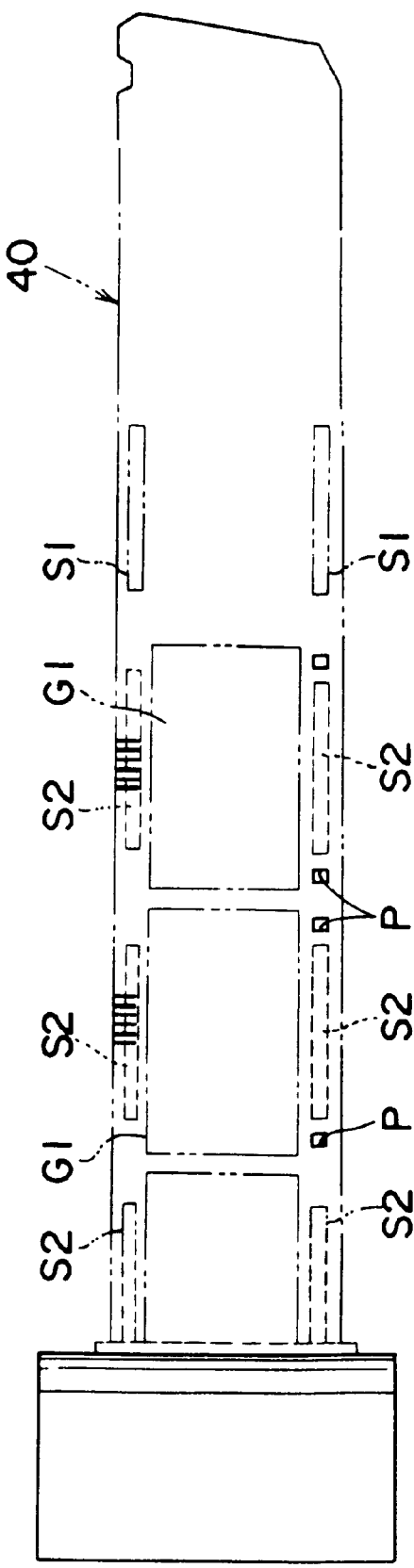
FIG. 2 is a plan view showing an example of a negative film set in a photographic printing apparatus.

FIG. 2 shows an example of the negative film 40 set in the image reading portion 12. One side of the negative film 40 is a surface applied with an emulsion, and a magnetic material (not shown) is applied to the other side. The magnetic tracks S2 are formed on both sides of each of image frames G1 in positional correspondence to each other, and the magnetic tracks S1 are formed at the end of the negative film 40.

The magnetic tracks S1 at the end of the negative film 40 are tracks for magnetically recording each of camera type identification information representing the type of the camera used for photographing and film type identification information representing the type of the negative film 40 in an encoded form. The camera type identification information corresponds to information on a camera as defined by the present invention, and the film type identification information corresponds to information on a photographic film as defined by the present invention. As the camera type identification information, for example, the model number and trade name of a camera in an encoded form and the like may be used. As the film type identification information, the model number, trade name, or characteristics such as sensitivity and graininess in an encoded form may be used. The year of the manufacture of the negative film 40 may be further recorded as the film type identification information.

The magnetic tracks S2 corresponding to each of the image frames G1 are tracks for magnetically recording information at the time of photographing, including information that represents conditions at the time when an image is photographed and recorded on each of the image frames G1. In the present embodiment, the information at the time of photographing is constituted by lens type identification information representing the type of lens used for photographing, magnification information representing the magnification at the time of photographing, and stop information representing the stop at the time of photographing. As the lens type identification information, for example, lens model numbers, F numbers, trade names, and lens types such as a wide range telephoto type may be used in an encoded form. Other information at the time of photographing other than magnification and stop, e.g., shutter speed and whether the strobe light is turned on or not, may be included in the form of numerical values in the information at the time of photographing.

While high grade cameras such as single lens reflex cameras have an information recording function for recording information on the magnetic tracks S1 and S2, cameras at relatively low prices such as lens-loaded films and compact cameras generally have no information recording function. In a camera having the information recording function, the camera type identification information and film type identification information is recorded on the magnetic tracks S1 when the negative film 40 is loaded in the camera, and the information at the time of photographing is recorded on the magnetic track S2 each time an image is photographed. The film type identification information may be magnetically recorded on the negative film when it is manufactured. On the other hand, in the case of a camera having no information recording function, since no information can be recorded on the magnetic tracks S1 and S2, the camera type identification information and film type identification information is recorded on the magnetic track S1 when the negative film 40 is manufactured with no information recorded on the magnetic tracks S2.

In the case of cameras such as lens-loaded films (hereinafter referred to as "LF cameras") whose body, lens and negative film are integrated and whose magnification and stop are fixed (cameras for which photographic conditions are fixed), even though they have no information recording function, predetermined camera type identification information may be recorded on the magnetic tracks S1 when the negative film 40 is manufactured, to allow the types of the lens and negative film used for photographing to be identified at the same time when it is determined based on such recorded information as whether it is an LF camera and the model number. Therefore, there is no problem even though no information is recorded on the magnetic tracks S2.

Further, in the case of cameras having integrated body and lens and using a detachable film such as compact cameras, even through they have no information recording function, a configuration may be employed wherein predetermined camera identification information different from that of LF cameras as described above, is recorded on the magnetic tracks S1 when the negative film 40 is manufactured and information is overwritten with a camera having an information recording function. This allows such cameras to be distinguished from single lens reflex cameras and LF cameras based on a determination from such information.

Conditions at the time of photographing such as magnification and stop may vary each time photographing is performed for some cameras having no information recording function. In the case of such cameras, although the information on magnification and stop can not be recorded on the magnetic tracks S2, a structure may be employed wherein a mechanism is provided to form marks on the negative film 40 in accordance with magnification and stop, and the marks thus formed are optically detected by the apparatus for photographic process 10. This allows magnification and stop to be identified with only a very simple additional structure.

The operation of the present embodiment will now be described.

Figure 3:
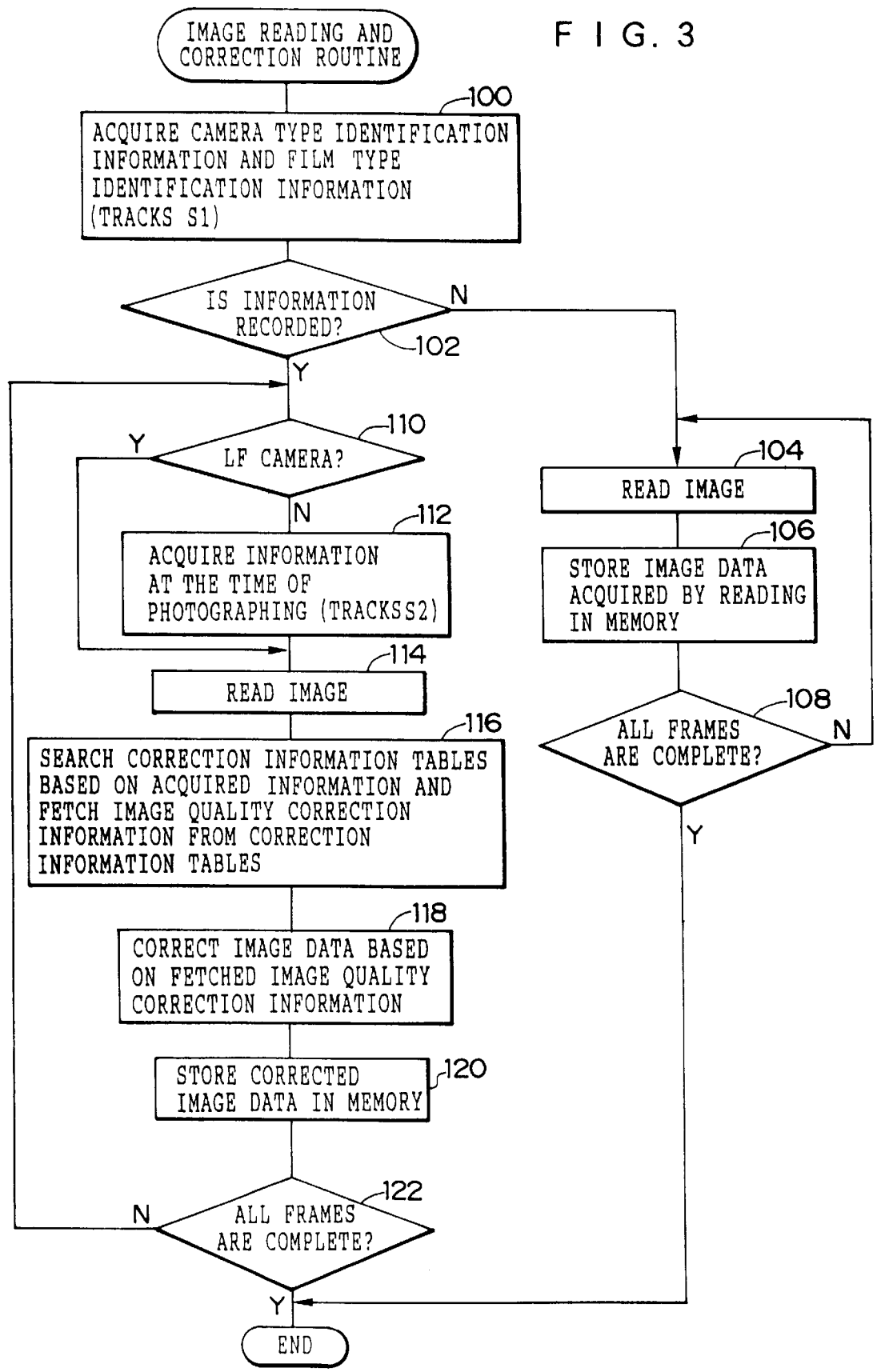
FIG. 3 is a flow chart showing an image reading and correction routine executed in an image reading portion.

First, the process of reading and correcting an image performed by the image reading portion 12 will be described with reference to the flow chart in FIG. 3. The flow in FIG. 3 is executed when the negative film 40 is set at the image reading portion 12 and an instruction is given to initiate reading. At step 100, the camera type identification information and film type identification information magnetically recorded on the magnetic tracks S1 are read from the negative film 40 which is being transported. The information read by the magnetic head 28 is fetched into the first control portion 30 and is stored in a memory such as a RAM in the first control portion 30. It is determined at step 102 whether any information has been read or not, i.e., whether any information is magnetically recorded on the magnetic tracks S1 or not.

If no information is magnetically recorded on the magnetic tracks S1 (the determination at step 102 is NO), the process proceeds to step 104. At step 104, the negative film 40 is transported to position an image frame G1 on an exposure position, and the image in the positioned image frame G1 is read by the CCD image sensor 28. At step 106, the image data output by the CCD image sensor 28 is fetched and stored in the memory 32 without performing a correction which will be described later. It is determined at step 108 whether image reading has been completed on all of the image frames G1 photographed and recorded on the single film 40. If the determination at step 108 is NO, the process returns to step 104 to repeat the above-described operations. Thus, a plurality of images photographed and recorded on the negative film 40 are sequentially read starting with that in the image frame G1 at the leading end of the film, and image data representing the read images are stored in the memory 32. When all of the image data corresponding to the plurality of images photographed and recorded on the negative film 40 are stored in the memory 32, step 108 makes a positive determination to terminate the process.

Meanwhile, if information is magnetically recorded on the magnetic tracks S1, step 102 makes a positive determination and the process proceeds to step 110. It is determined at step 110 whether the camera used for photographing is an LF camera or not based on the camera type identification information read at step 100. Although cameras at low prices such as LF cameras normally have no information recording function, according to the present embodiment, predetermined camera type identification information is magnetically recorded on the magnetic tracks S1 when the negative film 40 is manufactured to allow identification of whether an LF camera is used or not based on a determination from the information on the magnetic tracks S1. If the determination at step 110 is NO, the process proceeds to step 112 where the information at the time of photographing, i.e., the information on the lens type, magnification, and stop, magnetically recorded on the magnetic track S2 from the negative film 40 which is being transported, and then proceeds to step 114. If the determination at step 110 is NO, it is determined that conditions at the time of photographing (lens, magnification, and stop) have not been changed, and the process proceeds to step 114 without executing step 112.

Considering the fact that some LF cameras having no information recording function have a strobe, a system may be configured wherein a mechanism is provided to form a mark on the negative film 40 depending on whether the strobe is turned on or not and wherein the presence or absence of the mark on the negative film 40 is optically detected when the determination at step 110 is YES. This makes it possible to determine whether the strobe is turned on or not with a simple additional structure.

At step 114, the negative film 40 is transported to position the image frame G1 (the image frame corresponding to the magnetic track S1 from which the information has been read) at a reading position, and the image thus positioned is read by the CCD image sensor 28. The image data acquired by the reading with the CCD image sensor 28 are fetched into the first control portion 30 through the amplifier 24 and A/D converter 26.

At the next step 116, image quality correction information tables stored in advance in a ROM or the like in the first control portion 30 are searched based on the information acquired at steps 100 and 112, and information for correcting the deterioration of the quality of the image photographed and recorded on the negative film 40 (hereinafter referred to as "image quality correction information") is fetched from the image quality correction information tables.

Figure 5A:
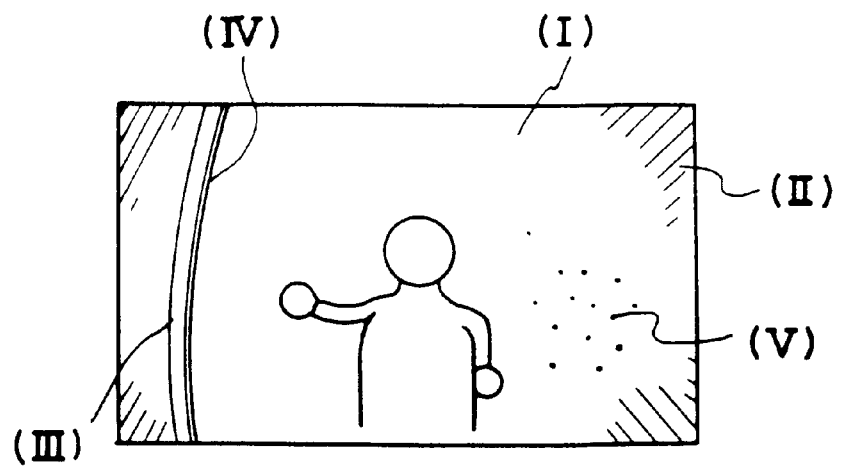
FIG. 5A illustrates various states of deterioration of image quality that appear on photographic prints.
Figure 5B:
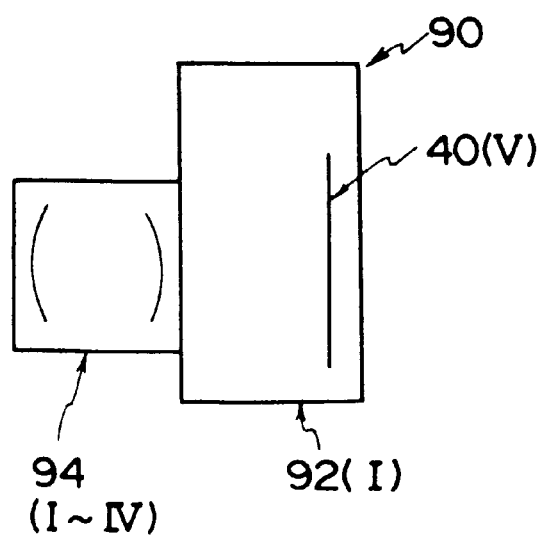
FIG. 5B illustrates relationship between each constituent portion of a camera and states of deterioration of image quality.

A description will now be made on various states of deterioration of image quality that appear on an image photographed and recorded on the negative film 40 with reference to FIG. 5A. FIG. 5A shows by the reference symbol (I) a state wherein fuzziness has occurred on the image as a whole as a result of inadequate formation of an image of an object or the like on the negative film 40 due to poor accuracy of a body 92 (see FIG. 5B) and a lens 94 of the camera used for photographing and poor assembling accuracy thereof. FIG. 5A further shows by the reference symbol (II) a state wherein the amount of exposure is smaller in a peripheral region of the image than in a central region according to the quadruple cosine rule for the lens 94 and this results in variation in density between the central and peripheral regions of the image. In FIG. 5A, the reference symbols (III) and (IV) further respectively indicate states of distortion and bleeding of colors which have occurred on the image due to the distortional aberration and chromatic aberration. The reference symbol (V) in FIG. 5A indicates a state wherein coarseness has appeared in image quality due to the graininess of the negative film 40.

The image quality correction information tables are generally categorized into that related to graininess and that related to other items. The image quality correction information table related to items other than graininess provides image quality correction information for various items that determine the quality of an image photographed and recorded on the negative film 40, i.e., the MTF (modulation transfer function), the ratio of amounts of light between central and peripheral regions of the image, contrast, distortion, bleeding of colors, and graininess. Specifically, this image quality correction information table is comprised of a first table and second table. As apparent from an example shown on Table 1 below, the first table is configured by storing selection numbers "XXXX" for the second table in correspondence to combinations of camera type identification information "a" and lens type identification information "b" to allow a predetermined second table to be selected based on camera type identification information "a" and lens type identification information "b" acquired from the magnetic tracks S1 and S2.

TABLE 1

| | camera | | |
|---|---|---|---|
| lens | $a_1$ | $a_2$ | $a_3$ |
| $b_1$ | XXX | XXX | XXX |
| $b_2$ | XXX | XXX | XXX |
| $b_3$ | XXX | XXX | XXX |

As apparent from an example shown in Table 2 below, a second table is configured by storing image quality correction information A, B, C, . . . in correspondence with combinations of magnification information "d" and stop information "e" among information at the time of photographing as described above. Each of the reference symbols A, B, C, . . . in Table 2 represents correction information on the above-described plurality of items for correction.

TABLE 2

| | magnification | | |
|---|---|---|---|
| stop | $d_1$ | $d_2$ | $d_3$ |
| $e_1$ | XXX | XXX | XXX |
| $e_2$ | XXX | XXX | XXX |
| $e_3$ | XXX | XXX | XXX |

Therefore, at step 116, the first table (Table 1) is searched to select a second table corresponding to a combination of the camera type identification information "a" and lens type identification information "b", and the selected second table is searched using the magnification information "c" and stop information "d" as a reference for selection to obtain any of the image quality correction information A, B, and C. Thus, correction information can be obtained for each of fuzziness on an image photographed and recorded on the negative film 40, reduction in the amount of light at a peripheral region of the image, reduction in contrast due to halation, distortion due to the aberration of the lens, and bleeding of colors.

Meanwhile, the above-described image quality correction information table related to graininess (hereinafter referred to as "third table") is configured, as shown on Table 3 below, by storing image quality correction information L, M, N, . . . for each type of negative film 12 as described above. At step 116, this third table is searched using the film type identification information "c" as a reference for selection to obtain any one of the correction information L, M, N, . . . for graininess of the negative film 40.

TABLE 3

| film | graininess |
|---|---|
| $c_1$ | L |
| $c_2$ | M |
| $c_3$ | N |

If it is determined at step 110 that an LF camera is used, acquisition of the information at the time of photographing is not performed at step 112. However, since the body, lens, and film of an LF camera are all integrated, the lens type identification information and film type identification information can be acquired at the same time when the camera type identification information is obtained from the magnetic track S1 and determined.

At the next step 118, correction processes are performed based on the image correction information fetched from the image quality correction information tables, i.e., second and third tables. Here, as an example, a correction process for each of the MTF, reduction in the amount of light at a peripheral region, and reduction in contrast on an image will be described.

(Correction of MTF)

A lens loaded in an LF camera, compact camera, or the like results in lower MTF characteristics throughout an image than those available with a high grade camera such as a single lens reflex camera because limitations are put on the design and manufacture of the same in consideration of the compactness and the low cost to be achieved. In this process of improving an MTF, an MTF is improved to provide a clear image by performing a filtering process for emphasizing high spatial frequencies. In the present embodiment, a process called "unsharp masking (hereinafter referred to as "USM") is performed to emphasize an image for improved image quality. In addition to the method utilizing a USM process as described above, an MTF may be corrected by employing a method wherein a deterioration function derived from a point spread function (PSF) of the lens is used to recover the image before deterioration.

(Process of Correcting Reduction in the Amount of Light at a Peripheral Region)

The lens of an LF camera or compact camera suffers from greater reduction in the amount of light at a peripheral portion of an image than in a central region which is more perceptible than that in a lens for a single lens reflex camera. Therefore, this correction process changes the tone (i.e., increases the brightness) of image data corresponding to a peripheral region of an image to provide a uniform image having no variation in density. Specifically, a correction coefficient g(i, j) for correcting the reduction in the amount of light at a peripheral region is extracted from connection information fetched from the second table, and image data f(i, j) are multiplied by the extracted correction coefficient g(i, j) as shown in Equation 1 to obtain corrected image data.

$$f(i, j) = g(i, j) * f(i, j) \qquad (1)$$

(Process of Correcting Reduction in Contrast)

An image photographed and recorded with an LF camera or the like normally has low contrast and looks somewhat dark as a whole. Therefore, this correction process converts the tone of an image as a whole, to provide a striking image with improved tone characteristics. Specifically, a tone conversion function LUT(x) for correcting a reduction in contrast is extracted from the correction information, and image data f(i, j) are calculated using the extracted tone conversion function LUT(x) as shown in Equation 2 to provide corrected image data. Conversion characteristics achieved using the tone conversion function LUT(x) may be stored as a lookup table to allow correction to be performed using such a lookup table.

$$f'(i, j) = LUT(f(i, j)) \qquad (2)$$

Although an example of a correction of image quality in accordance with the camera, lens, and film used for photographing has been described with reference to step 118, such correction may be performed in further consideration of the optical characteristics of the photographic printing apparatus 10 itself (the distortional aberration and chromatic aberration of the printing lens) and the characteristics of the photographic paper (graininess, resolution, color information recording characteristics, tone information recording characteristics, etc.). This makes it possible to further improve the quality of a photographic print obtained by a photographic printing process.

Next, the corrected image data f'(i, j) are stored in the memory 32 at step 120. It is determined at step 122 whether or not the series of image reading, image data correcting, and storing process has been completed on all of the image frames G1 photographed and recorded on the single film 40. If the determination at step 122 is NO, the process returns to step 110 to repeat the operations at the steps 110 through 120. Thus, a plurality of images photographed and recorded on the single negative film 40 sequentially starting with that at the leading end thereof; the image data of the read images are corrected depending on the states of deterioration in image quality; and the corrected image data are stored in the memory 32.

When the process of correcting image data has been completed on all of the plurality of images on the negative film 40, step 108 makes a positive determination to terminate the process.

Figure 4:
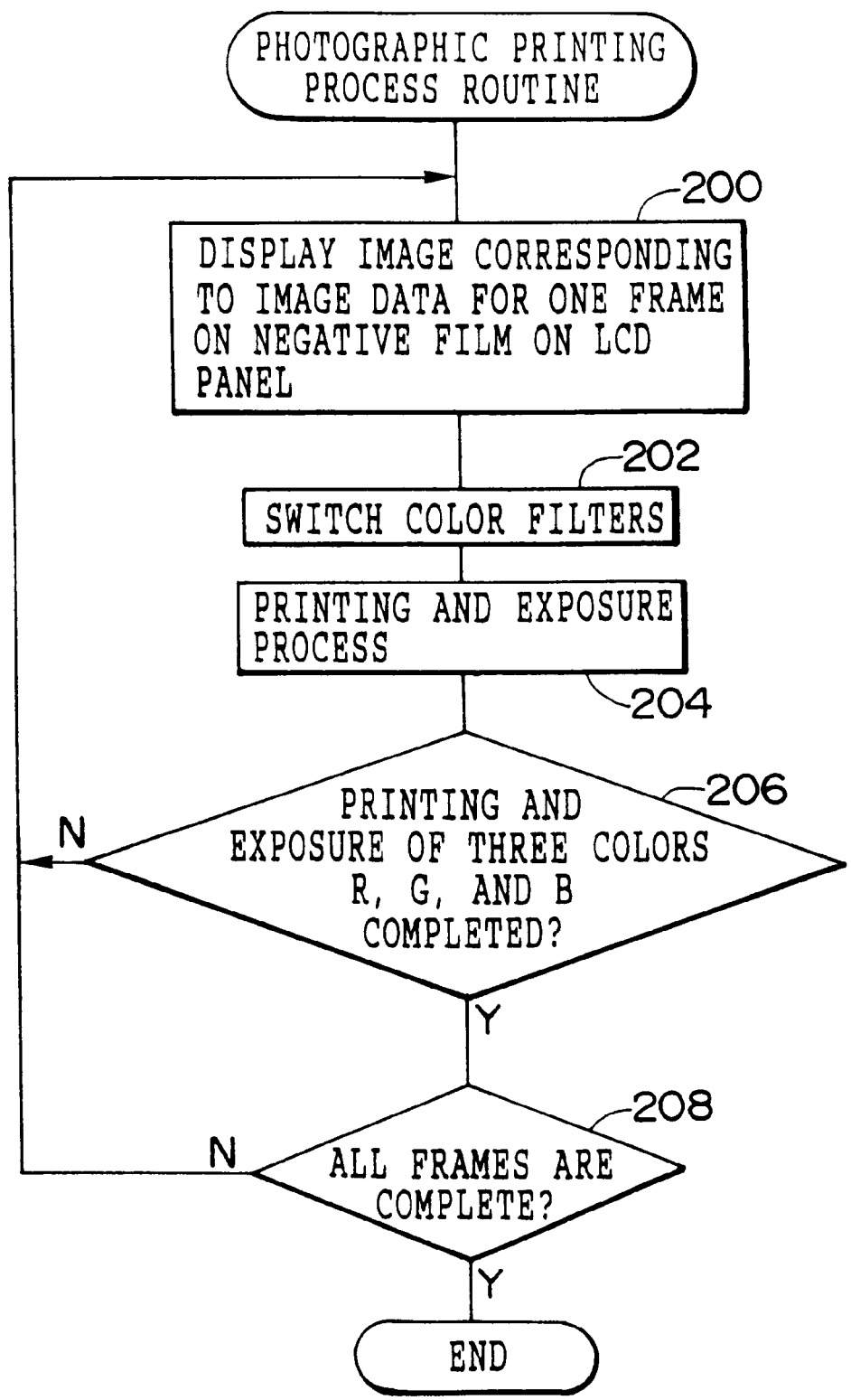
FIG. 4 is a flow chart showing a photographic printing routine executed in a printing portion.

A description will now be made of a photographic printing process performed at the printing portion 14 with reference to the flow chart in FIG. 4. The flow in FIG. 4 is executed when the storage of the image data in the memory 32 is complete and an instruction is given to commence a printing process. At step 200, the memory 32 is caused to output the image data for one frame to be printed, and the LCD panel 36 is caused to display the image. The image to be printed is stored in the memory 32 in the form of separated color components R, G, and B and each of the separated colors is sequentially output and displayed. At step 202, the color filter 46 is driven for inserting a filter having any one of the colors R, G, and B corresponding to the color image displayed on the LCD panel 36 into the printing light path. At the next step 204, the image displayed on the LCD panel 36 is printed. Specifically, the black shutter 52 is opened to cause light which has been emitted by the light source 38 and transmitted sequentially by the collimator lens 42, filters 44 and 46, and LCD panel 36 to be directed by the lens on the color paper 50 in the form of an image. At this time a color filter 46 having any one of the colors R, G, and B corresponding to the color image displayed on the LCD panel 36 has been selected and inserted in the printing light path. As a result, white light emitted from the light source 38 path is colored in any one of R, G, and B and directed to the LCD panel 36, and the image in any one of the colors R, G, and B displayed on the LCD panel 36 is printed and exposed on the color paper 50.

At step 208, it is determined whether or not printing and exposure have been completed for images in all of the colors R, G, and B. If the determination at step 208 is NO, the process returns to step 200 from which the above-described operations are repeated with the color component of the image displayed on the LCD panel 36 and the color of the filter 46 inserted in the printing light path is switched to another color. Thus, each of the color components R, G, and B of the image is printed and exposed on the color paper 50 in an overlapping relationship to provide a color image.

At step 208, it is determined whether or not the printing process has been completed for all of the image data stored in the memory 32. If the determination at step 208 is NO, the process returns to step 202 with the color paper 50 advanced, and steps 200 through 206 are repeated. Thus, the image data stored in the memory 32 are sequentially output one frame at a time to display an image on the LCD panel 36, and the displayed image is printed on the color paper 50 to produce a photographic print. Since the image data stored in the memory 32 are data which have already been corrected by the first control portion 30 (step 118), an image of high quality with reduced deterioration is displayed on the LCD panel 36 and printed on the color paper 50.

When the printing process has been completed for all of the image data stored in the memory 32, step 208 makes a positive determination to terminate the process.

As described above, according to the present embodiment, image data are corrected depending on the type of the camera used for photographing, the type of the photographic lens, and the characteristics of the negative film; the corrected image data are displayed on the LCD panel 36; and the displayed image is printed on the color paper 50 to produce a photographic print. As a result, a photographic print of high quality can be always obtained regardless of the type of the camera used for photographing, the type of the photographic lens, and the characteristics of the negative film. Specifically, camera type information representing the type of the camera, film type information representing the type of the film, and lens type identification information representing the type of the photographic lens is recorded on the magnetic tracks S1 and S2; the recorded information is acquired; and image data are corrected based on the acquired information. This makes it possible to very easily perform corrections on various kinds of deterioration of image quality such as fuzziness and distortion in an image and to automatically obtain a print of quality similar to that available in photographing with a high grade camera, even from an image photographed and recorded with a camera having relatively low performance such as an LF camera and compact camera.

Further, according to the present embodiment, information representing magnification and stop is acquired in addition to the lens type identification information, and image correction information is determined with the acquired information added. For example, the degree of reduction in the amount of light at a peripheral region of an image can vary when magnification and stop are varied (the lower the magnification, the higher the degree of reduction in the amount of light at a peripheral region of an image) even if the lens used for photographing is kept unchanged. Correction information obtained taking magnification and the like into consideration in addition to the type of the lens as in the present embodiment allows correction of an image to be performed more properly.

While the above embodiment has referred to, by way of example, a photographic printing apparatus for printing an image photographed and recorded on a negative film on photographic paper, the present invention is not limited thereto. For example, the present invention may be applied to image processing apparatus for processing an image photographed and recorded on a negative film on a computer and image display apparatus for displaying an image on a display such as a CRT, and the like.

While the above embodiment has referred to, by way of example, a photographic printing apparatus for reading an image photographed and recorded on a negative film and converting it into digital data, displaying an image on a LCD panel based on the converted image data, and printing the displayed image on color paper, the mode of printing by a photographic printing apparatus is not limited thereto. For example, a color image may be obtained by modulating laser light based on the image data of an image photographed and recorded on a negative film and by exposing a photosensitive element with the modulated laser light. Further, the present invention is not limited to the so-called digital photographic printing apparatus as described above and may be applied to a so-called analog photographic printing apparatus which performs printing by irradiating photographic paper directly with light transmitted by a negative film.

If an apparatus for photographic process according to the present invention is a so-called analog photographic printing apparatus, a light amount adjusting mechanism (e.g., a filter) for adjusting the amounts of light at peripheral and central regions of an image may be provided between the negative film and the light source, and the light amount adjusting mechanism may be controlled such that the amount of light at the peripheral region is increased based on camera type identification information and the like acquired from the negative film. This makes it possible to correct a reduction in the amount of light at the peripheral region according to the quadruple cosine rule of the lens, thereby providing a photographic print having no variation in density.

Further, although the above-described embodiment employs a negative film as a medium on which an image photographed with a camera is recorded, the present invention is not necessarily limited to negative films and, for example, reversal films and the like may be used.

Furthermore, camera type identification information, information at the time of photographing, and film type identification information is magnetically recorded on magnetic tracks provided on a negative film and such information is acquired form the magnetic tracks in the above-described embodiment. However, the present invention is not limited to magnetic recording, and optical recording may be performed using bar codes and the like. Further, such information does not need to be recorded on a negative film and may be input by an operator through a keyboard.

Moreover, in the above-described embodiment, the state of deterioration of the quality of an image photographed and recorded on a negative film is determined by searching image quality correction information tables based on the information acquired as described above. However, the present invention is not limited thereto, and the state of deterioration of image quality may be determined, for example, by calculating a computing equation prepared in advance with the above-described acquired information substituted therein.

In addition, the above embodiment corrects deterioration of an MTF (fuzziness of an image as a whole), the ratio of the amounts of light between central and peripheral regions of an image, distortion, bleeding of colors due to chromatic aberration, and graininess among various kinds of deterioration of the quality of an image photographed and recorded on a negative film. However, the items for correction are not limited thereto, and other items may be corrected.

As described above, the present invention is very much advantageous in that an image of high quality can be always obtained regardless of the type of the camera used for photographing, the type of the photographic lens, and the characteristics of the photographic film.

While a particular embodiment of the present invention has been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. An apparatus for photographic process comprising:
   an acquisition means for acquiring, from among information on a camera used for photographing and recording an image on a photographic film, information on a photographic lens used for photographing and recording the image with said camera, and information on said photographic film on which said image is photographed and recorded, at least said information on said photographic film;
   a determination means for determining, on a basis of at least said information on said photographic film which is acquired by said acquisition means, a state of deterioration in quality of the image recorded on said photographic film including at least a state of worsening of graininess of the image; and
   a correction means for correcting at least the worsening of graininess of the image based on the state of deterioration in quality determined by said determination means.

2. An apparatus according to claim 1, wherein at least any one of said information on the camera, said information on the photographic lens, and said information on the photographic film is one of optically and magnetically recorded on said photographic film and wherein said acquisition means acquires said information by one of optically and magnetically reading said information recorded on said photographic film.

3. An apparatus according to claim 1, further comprising: an image reading means for reading an image photographed and recorded on said photographic film to acquire image data representing said image wherein said correction means performs said correction of deterioration in image quality on the image data acquired by said image reading means.

4. An apparatus according to claim 3, wherein said correction means corrects deterioration of at least any one of an MTF, a ratio of an amounts of light between central and peripheral regions, contrast, distortional aberration, chromatic aberration, and graininess among the qualities of said image.

5. An apparatus according to claim 3, wherein states of deterioration of an MTF, a ratio of an amount of light between central and peripheral regions, contrast, distortional aberration, and chromatic aberration are determined based on said information on the camera and said information on the photographic lens and wherein a state of deterioration of graininess is determined based on said information on the photographic film.

6. A method for photographic process comprising the steps of:
   acquiring, from among information on a camera used for photographing and recording an image on a photographic film, information on a photographic lens used for photographing and recording the image with said camera, and information on said photographic film on which said image is photographed and recorded, at least said information on said photographic film;

determining, on a basis of at least said information on said photographic film which is acquired by said acquisition means, a state of deterioration in quality of the image recorded on said photographic film including at least a state of worsening of graininess of the image; and correcting at least the worsening of graininess of the image based on a determined state of the deterioration in image quality.

7. An apparatus for photographic process comprising:

an acquisition means for acquiring, from among information on a camera used for photographing and recording an image on a photographic film, information on a photographic lens used for photographing and recording said image with said camera, and information on sensitivity of said photographic film on which said image is photographed and recorded, at least said information on the sensitivity of said photographic film;

a determination means for determining, on the basis of at least said information on the sensitivity of said photographic film which is acquired by said acquisition means, an amount of correction for correcting graininess of said photographic film; and a correction means for correcting the graininess of said photographic film on a basis of an amount of correction determined by said determination means.

* * * * *